April 16, 1929.　　　　O. KUHNAST　　　　1,709,269

TWO-STROKE COMBUSTION ENGINE

Filed Jan. 18, 1927　　　2 Sheets-Sheet 1

O. Kuhnast
INVENTOR

Patented Apr. 16, 1929.

1,709,269

UNITED STATES PATENT OFFICE.

OSWALD KUHNAST, OF HORN, NEAR ROERMOND, NETHERLANDS.

TWO-STROKE COMBUSTION ENGINE.

Application filed January 18, 1927, Serial No. 161,904, and in the Netherlands November 30, 1926.

The invention relates to a two-stroke combustion engine in which the part of the cylinder below the piston serves as pumping room for the fuel-air-mixture, and for this purpose is provided with inlet ports controllable by the piston and connected with the carburettor piping, and with exhaust ports also controllable by the piston and connected with the inlet ports of the working cylinder. Moreover in the wall of the pumping room automatic suction valves are arranged by which air may be aspired from the crank chamber. The invention consists further in providing a fan for the piping to the carburettor to support the air supply.

The purpose of this invention is to obtain an efficient atomization of the fuel and further such a movement of the supplied air and of the fuel-air-mixture that first a sufficient quantity of air for scavenging enters into the working cylinder and then the fuel-air-mixture and these quantities are kept separated as much as possible. In this way an efficient combustion is obtained and no fuel or at any rate as small a quantity as possible of fuel is lost by scavenging.

One embodiment of the invention consists in forming a fan from by blades arranged at the periphery of the fly wheel and by a casing surrounding the same which at one side is provided with an inlet opening and at the other side is connected with the carburettor.

In the drawing the invention is explained as follows.

Figure 1:
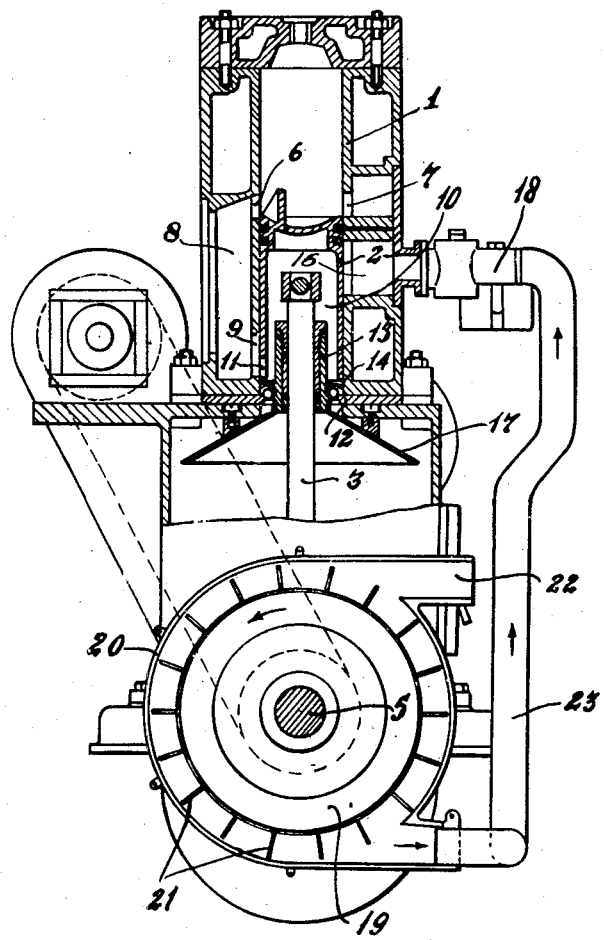
Fig. 1 is a back view, partly in section.

In each of the cylinders 1 a piston 2 is found which by means of a piston rod 3 and a driving rod 4 is connected with the crank shaft 5.

The cylinder is provided with inlet scavenging ports 6 and exhaust ports 7, as often usual with two-stroke cycle engines, these ports having a height of a part of the piston stroke and which in the lowest position (vide Fig. 1) of the piston are fully open. The inlet scavenging ports 6 are continuously connected with the space 10 below the piston by a channel 8 and an opening 9 in the cylinder wall. This connection is secured at the lowest position of the piston by an opening 11 in the piston wall.

The space 10 which at its upper side is limited by the piston 2 is closed at its bottom by a wall 12 in which also a stuffing box 13 for the piston rod 3 is arranged. Moreover valves 14 are disposed in this wall, which valves in the illustrated embodiment consists of balls which are pressed to their seat by one or more springs and then close the openings in the wall 12.

Figure 2:
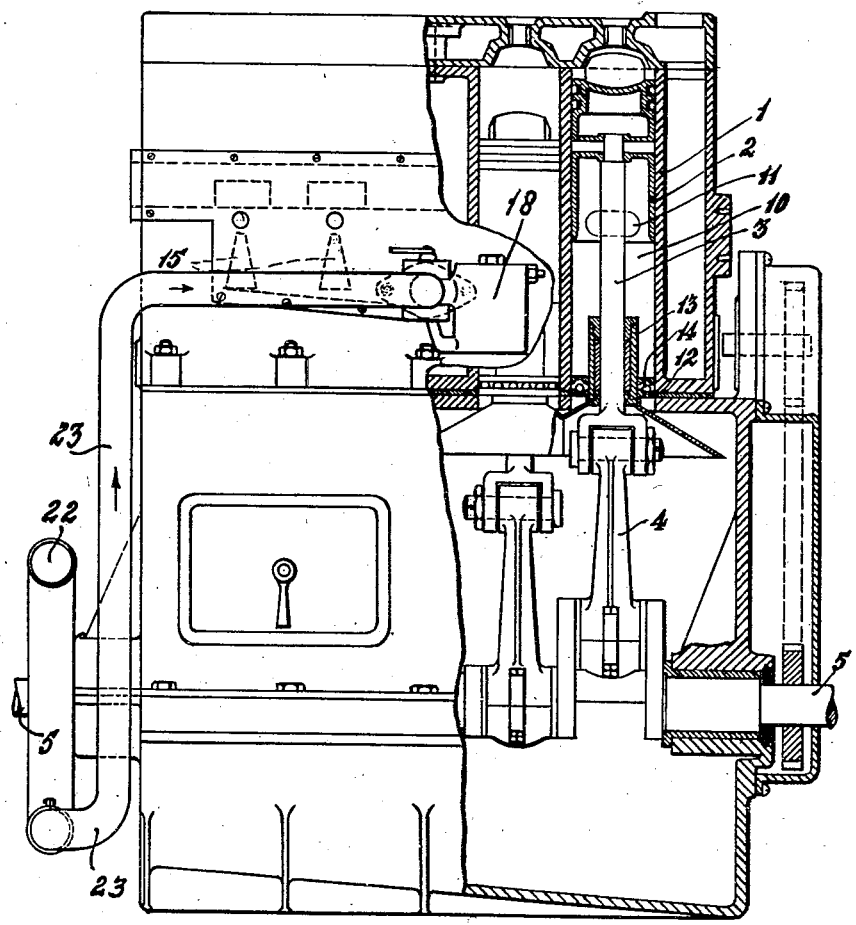
Fig. 2 is a side-view, partly in longitudinal section of an engine according to the invention.

Moreover ports 15 having a trapezoidal shape (vide Fig. 2) are arranged in the cylinder wall which ports at the highest position of the piston connect the space below it with a channel 16 leading to the carburettor 18.

The fly wheel 19 being provided at its periphery with a ring having blades 21 and rotating in the casing 20, by which the air is drawn in through the opening 22 and is led through the piping 23 to the carburettor 18 and further to the space 10 below the piston 2.

The engine functionates as follows:

The expansion stroke in the working cylinder being completed and the mixture having entered through the ports 6 and the combustion gases being removed through the ports 7, the piston 2 rises by which in the space 10 below the piston a depression in pressure arises. As soon as this depression is sufficient the valves 14 will be lifted and air will be aspired from the crank chamber into the space 10. In order to prevent the aspiration of lubricating oil splashing about in the crank chamber, below the valves 14, a screen 17 is arranged around the piston rod 3.

As soon as the inlet port 15 is left free by the piston the space 10 becomes connected with the channel 16 and through this with the carburettor so that a fuel-air-mixture will be aspired into the space 10 in which a relatively small depression in pressure prevails. The valves 14 will then close and furthermore this space will be filled owing to the fan function of the fly wheel and the air which has come through the valve 14 into the space 10 will be pressed into the channel 8 by the entering air. A relatively small depression in pressure prevailing in the space 10 and in the channel 8 the air will not be mixed so much with the entering air-fuel-mixture but the latter will press the air out. The channel 8 will then be filled with air.

Furthermore it may be observed that the trapezoidal shape of the port 15 serves for removing the unfavourable influence of the sudden connection of the carburettor with the space 10.

After the piston has obtained its highest position, it is again lowered by which the fuelair-mixture in the space 10 and the channel 8 is compressed until the ports 6 are again opened and the mixture flows into the combustion space.

As the air present in the channel 8 first enters into the cylinder, it is practically impossible that any fuel will be lost through the exhaust ports 7; on the other hand a complete filling is secured by the working of the fan.

I claim:

1. A two-stroke combustion engine having a cylinder, a piston in said cylinder, a bottom wall in said cylinder to serve as pumping and pre-compression space for the fuel-air-mixture and scavenging air, said cylinder part being provided with trapeze-shaped inlet ports controllable by the piston and connected with the carburettor, and with exhaust ports also controllable by the piston, inlet ports for the working cylinder, automatic valves arranged in said bottom wall of the pumping space through which into this space air is aspired to scavenge the cylinder, a carburettor, an air supply piping connected to the carburettor, an air fan in said piping whereby more efficient atomization of the fuel is obtained and a high pressure is imparted to the scavenging air, and thereby neutralizing completely the vacuum in the space under the piston, preventing the fuel-air-mixture flowing back in case the piston drops and bringing about a complete admission.

2. A two-stroke combustion engine according to claim 1, wherein the fan consists of a bladed ring surrounding the periphery of the fly wheel and a casing surrounding the same, said casing at one side being provided with a suction opening and at the other side being connected by means of a piping with the carburettor.

In testimony whereof I affix my signature.

OSWALD KUHNAST.